Sept. 1, 1925.
W. J. VAN DER KLOET ET AL
PIVOTAL CONNECTION FOR IRON STRUCTURES
Filed Dec. 1, 1921   3 Sheets-Sheet 1
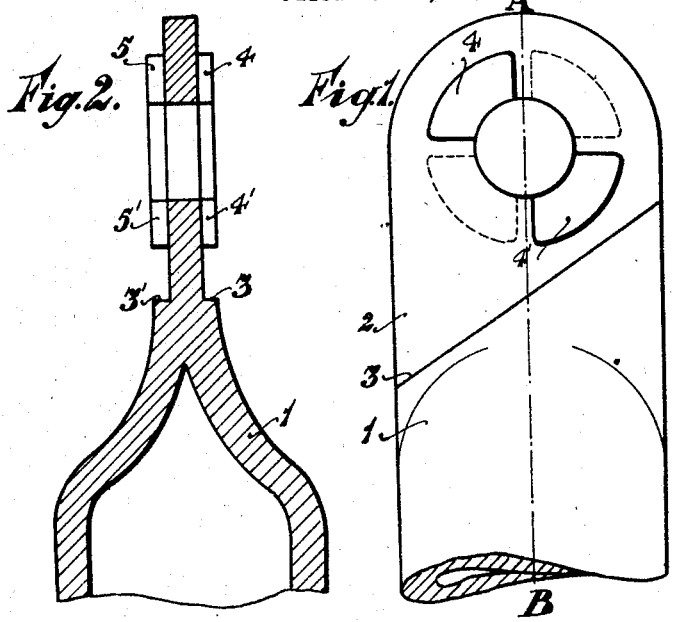
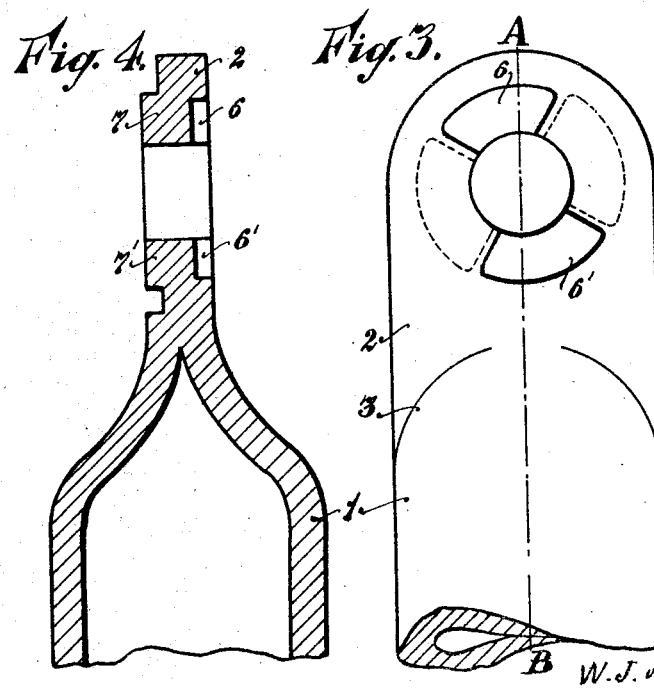
Inventors:
W. J. van der Kloet
& W. A. L. Stift Sept. 1, 1925. 1,551,716
W. J. VAN DER KLOET ET AL
PIVOTAL CONNECTION FOR IRON STRUCTURES
Filed Dec. 1, 1921 3 Sheets-Sheet 2

Inventors:
W. J. van der Kloet &
W. A. L. Stift
By Lawrence Langner
Attorney

Sept. 1, 1925.

W. J. VAN DER KLOET ET AL 1,551,716

PIVOTAL CONNECTION FOR IRON STRUCTURES

Filed Dec. 1, 1921   3 Sheets-Sheet 3

Inventors:

W. J. van der Kloet &
W. A. L. Stift

By Lawrence Langner
  Attorney

Patented Sept. 1, 1925.

1,551,716

UNITED STATES PATENT OFFICE.

WILLEM JOSUA VAN DER KLOET AND WILLEM ALEXANDER LODEWIJK STIFT, OF THE HAGUE, NETHERLANDS.

PIVOTAL CONNECTION FOR IRON STRUCTURES.

Application filed December 1, 1921. Serial No. 519,187.

*To all whom it may concern:*

Be it known that we, WILLEM JOSUA VAN DER KLOET and WILLEM ALEXANDER LODEWIJK STIFT, technical constructors, residing at The Hague, Netherlands, have invented certain new and useful Improvements in Pivotal Connections for Iron Structures, of which the following is a specification.

The present invention relates to a pivotal connection for all kinds of iron structures as: hangars, caps, bridges, cranes and other lifting-devices.

It enables one to assemble and erect the iron structure, at the spot where it is to be used, from parts, adapted to be made as bulk-articles in such dimensions, that they can be easly transported and handled. The building of the structure is effected in the simplest manner. The various parts, previously manufactured, are interconnected, preferably by means of specially designed bolts, to a steady whole, that as regards rigidity and interjunction, equalizes riveting and even possessing with respect thereto the important advantage, that the so formed connections are pivotal, whereas the hitherto usual connecting-plates are entirely done away with.

The invention consists primarily in this, that metal tubes, preferably jointless, cold-drawn steel tubes (e. g. "Mannesmann" tubes) in such lengths, that the collapsing tension remains minimum, e. g. varying from $5^I$ to $6^I$, are provided at both ends with a flat portion, having a bore for the passage of the steel bolt, establishing the connection.

For heavy iron-structures tubes may be employed, provided with longitudinal ribs, the so called: jointless longitudinally ribbed tubes.

The flat portion can be connected to the tube ends in different manners, e. g. by forging or stamping together.

The invention further consists in this, that the flat tube ends are provided with preferably quadrant-shaped recesses and projections respectively, disposed in a circle, the centre of which is the centre of bolt-hole.

In the accompanying drawings the invention is illustrated by way of example.

Fig. 1 is a front-elevation of one end of a tube provided with projections.

Fig. 2 is a section of the tube according to Fig. 1 on the line A—B.

Fig. 3 is a front-elevation of one end of a tube having projection and recess.

Fig. 4 is a section of the tube according to Fig. 3 on the line A—B.

Figure 6:
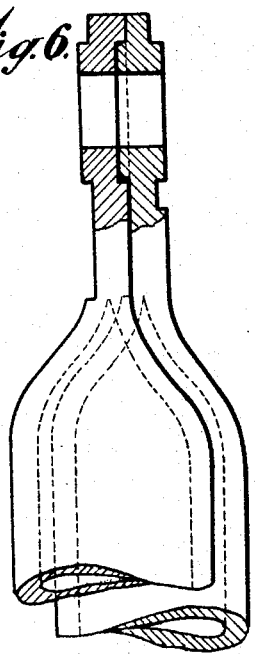
Fig. 6 is a side elevation of the connection according to Fig. 5.

As appears from Figs. 1 and 2 the jointless tube 1 is provided with a flat end 2, rounded at the upper side, having in this embodiment at both sides an inclined or oblique enlargement 3, 3'. According to the invention this enlargement may be arranged under arbitrary angles, in such a manner, that it forms a locking means or support for the connected tube. On the flat end at both sides projections 4, 4' and projections 5, 5' are provided respectively and in such a manner, that the projections belonging to one pair are diametrically disposed, whereas the separate projections at the front and back side, with regard to the longitudinal axis of the tube are situated under an angle of 45° and with respect to each other under an angle of 90°.

In the embodiment according to Figs. 3 and 4 the one side of the flat end 2 is provided with two diametrically disposed recesses 6, 6', whereas at the other side two, also diametrically disposed projections 7 and 7' are arranged.

The angle under which the projections and the recesses are arranged respectively with regard to the longitudinal axis of the tube, according to the invention is determined by the angle, formed by the tubes after the connection has been established. The enlargement 3 has in this embodiment a rounded shape.

Figure 5:
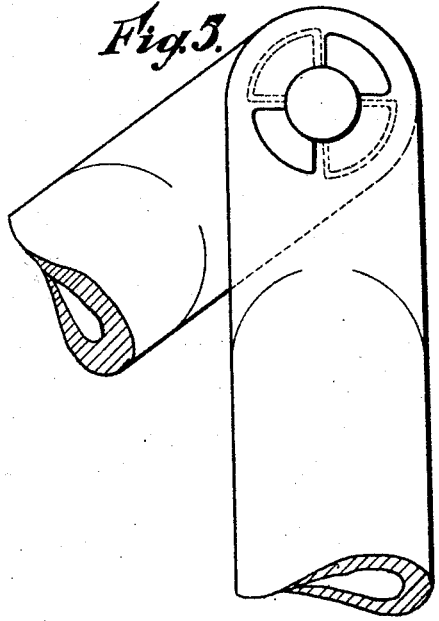
Fig. 5 is a front-elevation of a connection of two tubes having projections and recesses respectively.

In Fig. 5 it has been shown in what manner e. g. two tubes may be interconnected under an angle, determined by the mutual positions of the cooperating projections and recesses in connection with the requirements of the iron structure to be erected.

Figure 7:
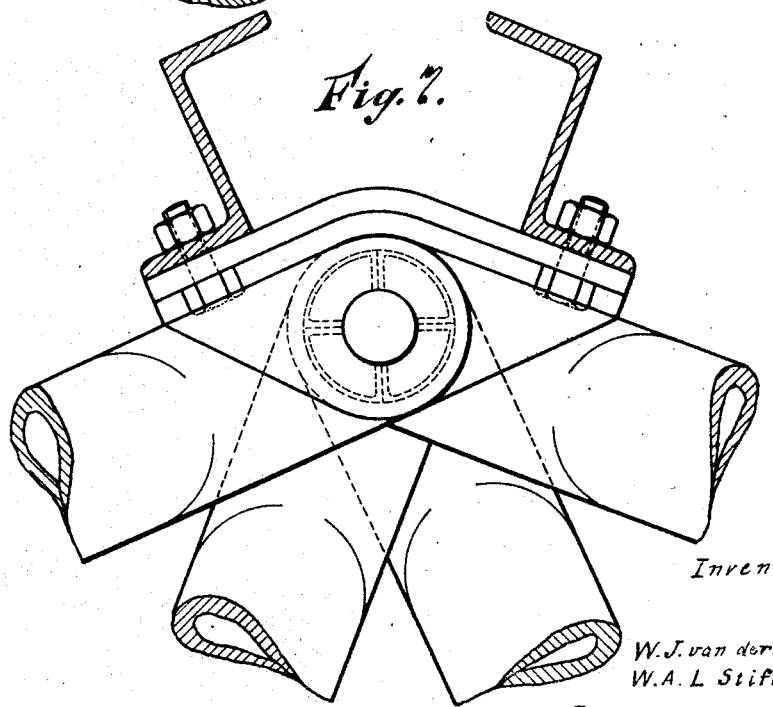
Fig. 7 is a front-elevation of a connection of four tubes having projections and recesses respectively.
Figure 8:
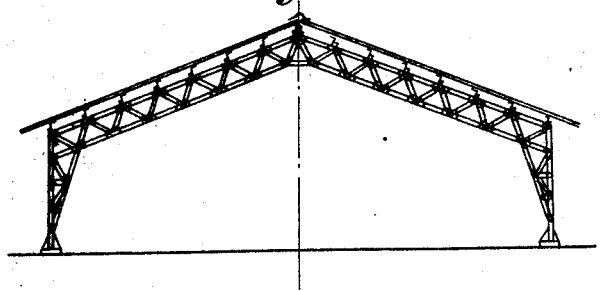
Fig. 8 shows a cap constructed in accordance with the invention.

Fig. 7 shows the connection for four tubes as is effected in certain cases.

It will be clear, that these connections may be varied in various ways, so that they can always be adopted for use with the practical structural requirements.

To this end it is sufficient to explain with reference to the work-drawing how many tubes and of which lengths are required and under which angles the pairs of projections and recesses have to be arranged with respect to each other. The projections should fit with such a play in the corresponding recesses, that the maximum practical articulation is not interfered with.

Any tension due to any load, as wind-pressure, weight of snow or the like will thus be received by the projections and recesses, which, after being stuck fast in each other, prevent further bending and guarantee the equilibrium of the structure.

The connection thus obtained complies with the requirements. The projections and recesses may be brazed in the metal or be forged on or stamped in it.

Besides the advantage aforementioned the construction according to the invention, enables to dismantle in a very simple manner an iron structure, whereupon the parts may be used again for erecting another structure or the like.

Claims—

1. A joint for use in metal buildings comprising a plurality of metal tubes, flat cooperating end portions on the tubes, interfitting, matched recesses and projections on the flat portions, said projections and recesses being arranged at an angle with respect to the axis of their tube, substantially equal to the angle between the tubes when connected.

2. A joint according to claim 1, the flat end portions being defined by an enlargement positioned at an angle to the tube axis, equal to the angle between the tubes when connected.

3. A joint according to claim 1, said recesses and projections being arc shaped, and proportioned to permit a considerable degree of play between joined tubes.

4. A joint for use in metal buildings, comprising, a plurality of metal tubes, flat cooperating end portions on the tubes, interfitting matched recesses and projections on the flat portions, the said projections and recesses being arc-shaped and located at an angle with respect to the axis of their tube, substantially equal to the angle between tubes when connected, and said recesses and projections being also proportioned to permit a considerable degree of play between the connected tubes, the flat end portions of the tubes being defined by an enlargement positioned at an angle to the tube axis which angle is equal between the tubes when connected.

5. A joint for use in metal buildings, comprising, a plurality of metal tubes, flat cooperating end portions on the tubes, interfitting pairs of matched recesses and projections on the flat portion, said pairs of projections and pairs of recesses being arranged at an angle with respect to the axis of their tube, which angle is substantially equal to the angle resulting upon connecting the tubes.

In testimony whereof we affix our signatures.

WILLEM JOSUA van der KLOET.
WILLEM ALEXANDER LODEWIJK STIFT.